United States Patent
Monereau et al.

(10) Patent No.: US 9,895,646 B2
(45) Date of Patent: Feb. 20, 2018

(54) METHOD OF PRESSURE SWING ADSORPTION WITH REGULATION

(71) Applicant: L'Air Liquide, Société Anonyme pour l'Etude et l'Exploitation des Procédés Georges Claude, Paris (FR)

(72) Inventors: Christian Monereau, Montpellier (FR); Yann-Pierrick Lemaire, Verrières (FR); Louis Toulemonde, Douai (FR); Paulo Silva, Cergy (FR)

(73) Assignee: L'Air Liquide, SociétéAnonyme pour l'Etude et l'Exploitation des Procédés Georges Claude, Paris (FR)

( * ) Notice: Subject to any disclaimer, the term of this patent is extended or adjusted under 35 U.S.C. 154(b) by 39 days.

(21) Appl. No.: 15/027,209

(22) PCT Filed: Oct. 1, 2014

(86) PCT No.: PCT/FR2014/052488
§ 371 (c)(1),
(2) Date: Apr. 4, 2016

(87) PCT Pub. No.: WO2015/049462
PCT Pub. Date: Apr. 9, 2015

(65) Prior Publication Data
US 2016/0250580 A1   Sep. 1, 2016

(30) Foreign Application Priority Data
Oct. 4, 2013 (FR) ..................................... 13 59625

(51) Int. Cl.
*B01D 53/047* (2006.01)

(52) U.S. Cl.
CPC ........ *B01D 53/047* (2013.01); *B01D 2256/16* (2013.01); *B01D 2257/504* (2013.01); *B01D 2259/40039* (2013.01); *B01D 2259/40047* (2013.01)

(58) Field of Classification Search
CPC .............. B01D 53/047; B01D 2256/16; B01D 2257/504; B01D 2259/40039; B01D 2259/40047; B01D 2259/40052; C01B 3/56
USPC ................................ 95/96–98, 100, 103, 139
See application file for complete search history.

(56) References Cited

U.S. PATENT DOCUMENTS

| | | | | |
|---|---|---|---|---|
| 4,315,759 A * | 2/1982 | Benkmann | ........... | B01D 53/047 95/23 |
| 4,475,930 A * | 10/1984 | Asztalos | ............. | B01D 53/047 95/98 |
| 4,705,541 A * | 11/1987 | Sircar | .................. | B01D 53/047 95/130 |
| 5,997,612 A * | 12/1999 | Doong | ................. | B01D 53/047 95/101 |
| 2005/0098034 A1 * | 5/2005 | Gittleman | ............ | B01D 53/047 95/96 |
| 2006/0288867 A1 * | 12/2006 | Herb | ..................... | B01D 53/047 95/96 |
| 2008/0202337 A1 * | 8/2008 | Taylor | ................ | B01D 53/0476 95/101 |

FOREIGN PATENT DOCUMENTS

FR    2892322    *  4/2007

* cited by examiner

*Primary Examiner* — Frank Lawrence
(74) *Attorney, Agent, or Firm* — Elwood L. Haynes

(57) ABSTRACT

A pressure swing adsorption process for producing a gas stream enriched in a compound X from a feed gas stream is provided. The process includes at least 2 adsorbers, with each adsorber being subjected to a pressure cycle having a high pressure and a low pressure. The process includes adsorption at the high pressure with production of the gas stream enriched in compound X, depressurization to the low pressure with production of at least one portion of an elution gas, c) elution at the low pressure, and repressurization to the high pressure. The pressure cycle has a phase time corresponding to the duration of a pressure cycle divided by the number of adsorbers. The pressure of the pressure cycle is modified to keep the phase time of the PSA equal to or within ±5% of the nominal phase time.

9 Claims, 4 Drawing Sheets

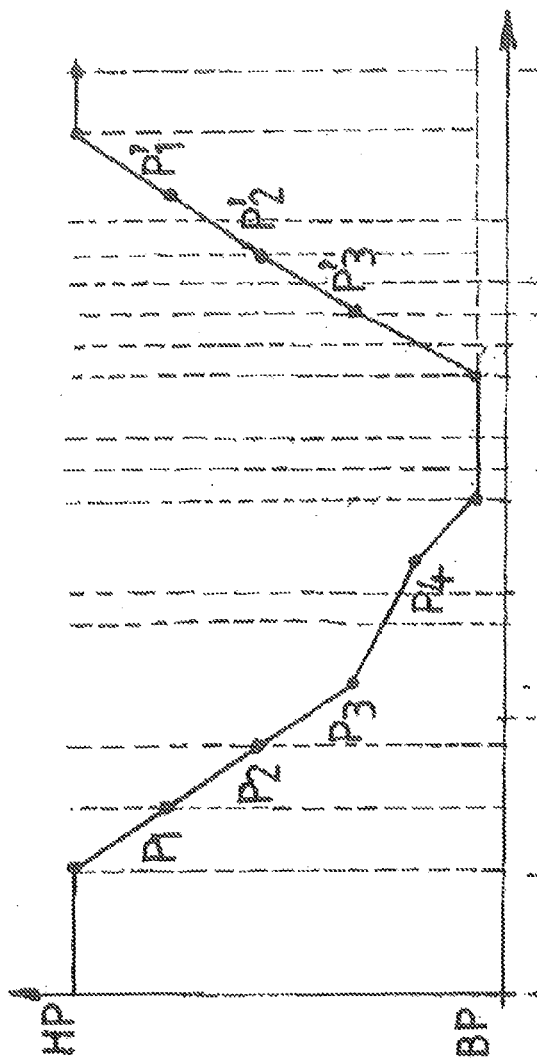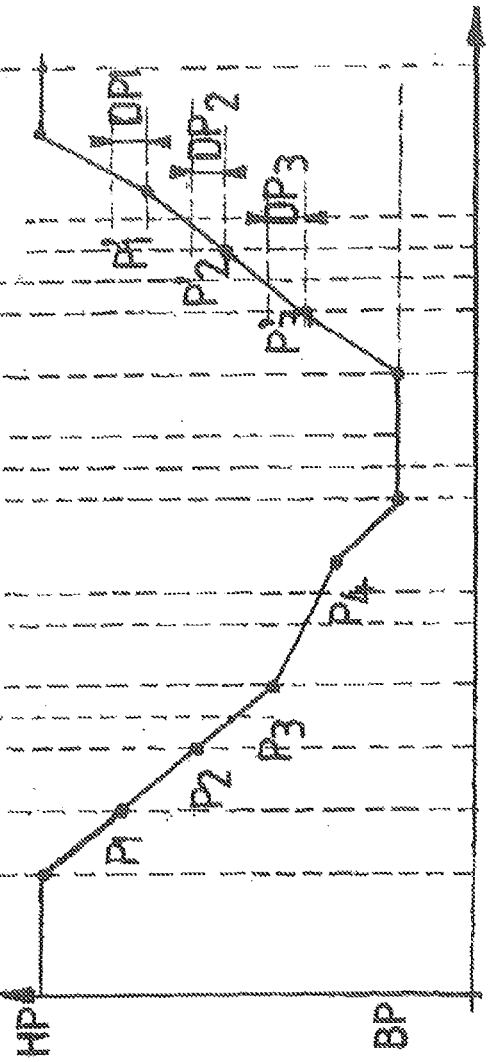

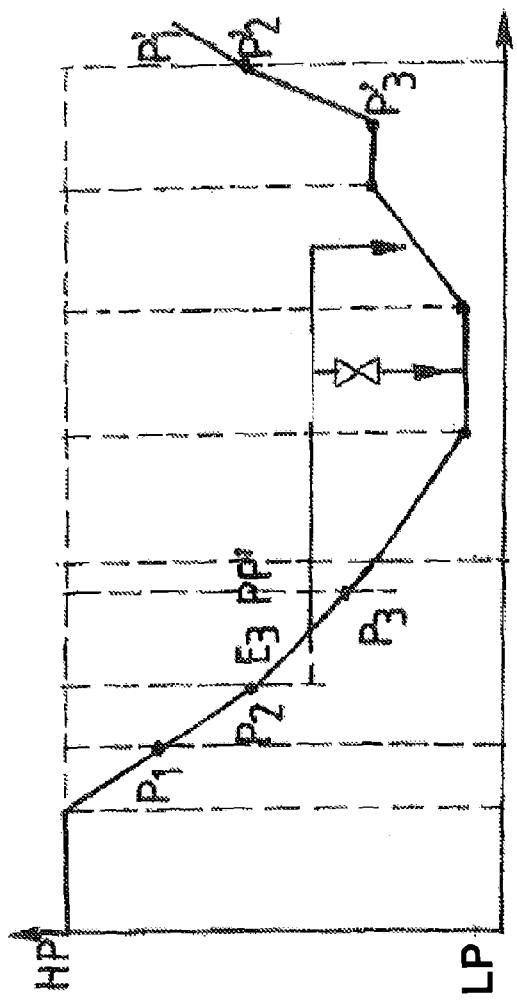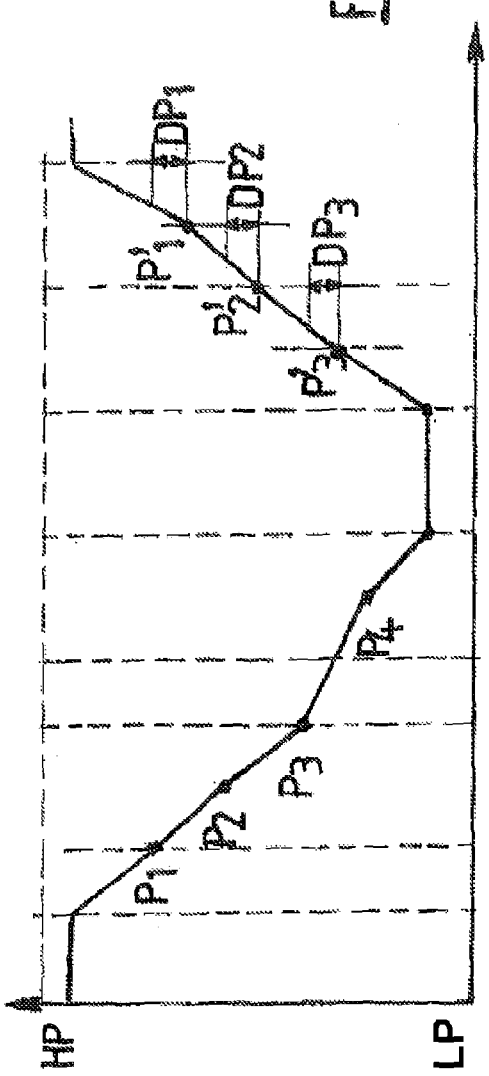

METHOD OF PRESSURE SWING ADSORPTION WITH REGULATION

CROSS REFERENCE TO RELATED APPLICATIONS

This application is a 371 of International PCT Application PCT/FR2014/052488 filed Oct. 1, 2014, which claims priority to French Patent Application No. 1359625 filed Oct. 4, 2013, the entire contents of which are incorporated herein by reference.

BACKGROUND

The present invention relates to a process for treating a gas by adsorption, of the type in which use is made of a pressure swing adsorption treatment unit, commonly referred to as a PSA unit, and in which said unit is regulated via pressure equalizations and/or the elution gas.

PSA units are commonly used for the separation and/or purification of feed gas, especially in the fields of producing hydrogen, helium or carbon dioxide, of drying, of separating the constituents of air, etc.

"PSA-H2" units which produce substantially pure hydrogen are used with feed gases of varied origin, formed for example from gases resulting from steam reforming, refinery gases or coke-oven gases, or else formed from waste gases from ethylene or styrene production units, or from cryogenic hydrogen-carbon monoxide separation units.

Generally, a PSA unit consists of several adsorbers which follow, with a time lag, an operating cycle, subsequently referred to for convenience as a "PSA cycle", which is uniformly distributed over as many phase times as there are adsorbers in operation, and which is formed from basic steps, namely the steps of:
  adsorption at substantially a high pressure of the cycle;
  co-current depressurization, generally from the high pressure of the cycle;
  counter-current depressurization, generally to the low pressure of the cycle;
  elution at substantially the low pressure of the cycle; and
  repressurization, from the low pressure of the cycle to the high pressure of the cycle.

Co-current depressurization generally comprises one or more equalization steps and at least one purge-providing step which supplies the elution gas.

Repressurization generally comprises the corresponding equalization steps and a final repressurization with production gas or elution gas.

These steps define the characteristic pressures of the PSA.

FIG. 1 corresponds to a cycle with three complete equalizations, the pressures at the end of equalization for the depressurization adsorber being respectively P1, P2, P3 and P'1, P'2, P'3 for the repressurization adsorber with equality between these pressures (P1=P'1, etc.).

The elution gas is extracted, for its part, between P3 and P4.

FIG. 2 corresponds to a cycle comprising incomplete equalizations characterized by a residual pressure difference at the end of the steps between the depressurizing adsorber and the repressurizing adsorber: DP1, DP2, DP3.

FIG. 3 corresponds to a cycle where the purge-providing step is simultaneous with the equalization 3. The gas resulting from the depressurization between P2 and P3 is distributed between elution and equalization. In case of a simultaneous step, the ratio of gas allocated to the elution is an important parameter.

The staging of the pressures P1, P2, P3, P4, etc. between the high pressure and the low pressure of the cycle is one of the important characteristics of the cycle which set the performance thereof.

Indeed, they determine the amounts of gas exchanged between adsorbers and the amount of elution gas. In this way, they act both on the extraction efficiency of the PSA and on the productivity of the adsorbent, and thereby on the investment.

Hereafter, the description relates to the operation of a PSA unit in the steady state, i.e. outside of transient periods during which the unit is started up or shut down, which generally correspond to special cycles set up for this purpose.

The main operating constraint of a PSA unit in the steady state consists of the degree of purity of the product. Under this operating condition, the treatment performance level of a PSA unit are then generally optimized either in order to maximize the extraction efficiency (amount of gas produced/amount of this gas present in the feed gas), or in order to minimize the energy consumed or more generally in order to reduce the operating costs, or in order to minimize the investment.

Obtained in this way is a nominal operating cycle of the PSA unit, which is determined directly as a function of the nominal operating conditions (flow rate of the feed gas, flow rate of the treated gas, composition of the feed gas, operating temperature of the unit, pressures, etc.).

When the operating conditions depart from the nominal conditions, it has been proposed to date to regulate the operation of the PSA unit by adjusting one or more parameters of the nominal cycle so as to guarantee that the treatment performance levels remain above predefined minimum limits. Two regulations that come under this approach are:
  "capacity" regulation, which consists in modifying the duration of the phase time of the cycle as a function of the variation in the feed gas flow rate; and
  "purity control" regulation, which consists in modifying the phase time as a function of the purity of the treated gas.

It is advisable here to define what is understood by cycle time and phase time (or more simply phase).

As has been described above, an adsorber will therefore begin an adsorption period until it is loaded with the constituent(s) to be stopped at the high pressure, then will be regenerated by depressurization and extraction of the adsorbed compounds before being restored in order to restart a new adsorption period. The adsorber has then carried out a "pressure cycle" and the very principle of the PSA process is to link these cycles together one after the other; it is therefore a cyclic process. The time that an adsorber takes to return to its initial state is referred to as the cycle time. In principle, each adsorber follows the same cycle with a time lag that is referred to as the phase time or more simply the phase. The following relationship therefore exists:

Phase time=cycle time/number of adsorbers and it is seen that the number of phases is equal to the number of adsorbers.

There may be any number N of adsorbers, but generally N is between 2 and 32, more typically between 4 and 16.

In practice, there are a large number of options for performing the two-fold (capacity, purity) regulation, the result of which is to operate the PSA simultaneously under good purity and efficiency conditions. Generally, the variations in flow rate modify the first-order cycle time and the analysis comes as correction. The actions of the regulators are to regulate in order to ensure that the purity will be maintained. The actions may be asymmetric, i.e. rapid and large if the pollution increases and on the contrary slow and measured in the case of too high a quality of the hydrogen. As a reminder, various practices exist in order to anticipate the variations in purity of the hydrogen such as carrying out an analysis in the adsorbent bed, for example at 95% of the total volume, and not at the outlet or analyzing the gas during one of the co-current (equalization or purge-providing) steps.

This basic regulation which ensures the performance levels is generally supplemented by additional regulations. Indeed, the modification of the cycle time in order to adapt the adsorption time to the new conditions (flow rate, composition of the feed, etc.) results in all the phases of the cycle being modified in the same way. Depending on the cycles, it is possible to maintain the steps at their initial duration and supplement up to the duration of the new phase, assumed here to be lengthened, with a dead time (with or without closure of the valves depending on the configuration of the circuits) or by lengthening some of the steps. In order to make the flow rates as regular as possible, if the cycle allows it, the counter-current blowdown, purge-providing and repressurization steps will thus be lengthened.

Ultimately, under stabilized operation, assumed here to be at reduced feed flow rate, a production having the required purity and the nominal efficiency of the cycle used is obtained.

Nevertheless, the fact remains that the unit operating under these new conditions is overdesigned with respect to a design which would have been made specifically regarding this case. The amortization of the initial investment comes down to a lower hydrogen production and the specific cost is therefore higher. Over long operating periods of the unit, this operation is economically poor.

SUMMARY

The objective of the invention is to take advantage of this overdesign in order to improve the economic conditions of the production, in particular by increasing the extraction efficiency, i.e. by producing more marketable hydrogen if it is the feed flow rate which is limited for some reason or by reducing the amount of feed gas necessary and thereby, for example, the amount of natural gas consumed in order to generate the syngas produced via an SMR, if the production is fixed.

One solution of the invention is a pressure swing adsorption (PSA) process for producing a gas stream enriched in a compound X from a feed gas stream, using at least 2 adsorbers, each adsorber being subjected to a pressure cycle having a high pressure and a low pressure and comprising the following successive steps:

a) adsorption at the high pressure of the cycle with production of the gas stream enriched in compound X, b) depressurization to the low pressure of the cycle with production of at least one portion of an elution gas, c) elution at the low pressure by means of the elution gas, d) repressurization to the high pressure, characterized in that:

said process comprises a regulation during which, as a function of the operating conditions of the PSA, a pressure of the pressure cycle, located between the high pressure and the low pressure of the pressure cycle, is modified.

BRIEF DESCRIPTION OF THE DRAWINGS

For a further understanding of the nature and objects for the present invention, reference should be made to the following detailed description, taken in conjunction with the accompanying drawing, in which like elements are given the same or analogous reference numbers and wherein:

FIG. 1 illustrates a step that defines the characteristic pressures of the PSA.

FIG. 2 illustrates a step that defines the characteristic pressures of the PSA.

FIG. 3 illustrates a step that defines the characteristic pressures of the PSA.

FIG. 5 illustrates operation in accordance with one embodiment of the present invention, as a function of the operating conditions and of the economic conditions set by the client.

DESCRIPTION OF PREFERRED EMBODIMENTS

Figure 4:
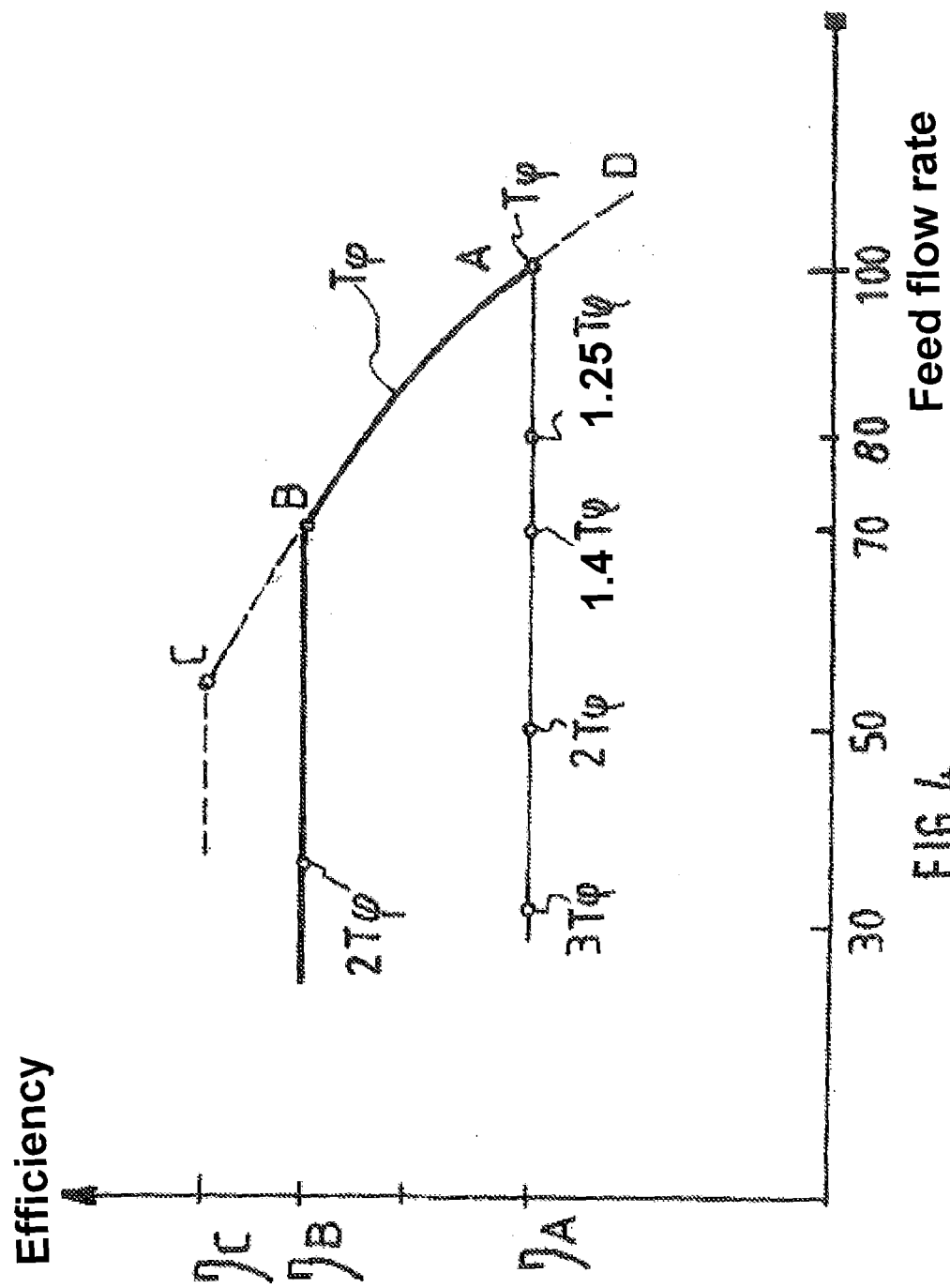
FIG. 4 illustrates the difference between the standard regulation and the regulation in accordance with one embodiment of the present invention.

Depending on the case, the process according to the invention may have one or more of the following characteristics:

the operating conditions of the PSA are selected between the feed flow rate, the feed temperature, the composition of the feed gas, the low pressure, the high pressure, the required concentration of compound X in the enriched gas stream and the required flow rate of the gas stream enriched in compound X;

the pressure cycle comprises at least 1 equalization, and the depressurization step b) comprises at least a first sub-step of co-current depressurization and at least a second sub-step of counter-current depressurization, and the modified pressure of the pressure cycle, located between the high pressure and the low pressure of the pressure cycle, is selected between the pressures at the start or end of equalization, the pressures at the start or end of production of the elution gas, and the pressure at the start of counter-current depressurization;

the pressure selected from the pressure cycle, located between the high pressure and the low pressure of the pressure cycle, is modified via at least one of the residual pressure differences at the end of equalization. The set points corresponding to DP1, DP2, etc. (see FIG. 2) are then calculated according to the new regulation;

at least one of the pressures at the start or end of one at least of the steps for production of the elution gas is modified, thus changing the quantity and/or the quality of the elution gas. It should be noted that the gas resulting from the depressurization is less and less rich in compound X as the pressure drops. By acting on the pressures, it is therefore possible both to modify the amount of gas withdrawn and its composition and have a two-fold effect on the efficiency of the elution;

the elution gas comprises a fraction of a gas stream resulting from the depressurization of an adsorber and a fraction of the gas stream enriched in compound X or a fraction rich in compound X originating from another unit;

the pressure cycle has a phase time corresponding to the duration of a pressure cycle divided by the number of adsorbers and the pressure of the pressure cycle, located between the high pressure and the low pressure of the pressure cycle, is modified so as to keep, during at least one portion of the range of variation of the operating conditions, the phase time of the PSA equal to or within ±5% of the nominal phase time, corresponding to the phase time of the PSA under the design conditions. In other words, the regulation makes it possible to minimize the difference between the actual cycle time and the nominal cycle time.

The examples will describe in greater detail the range of variation of the operating conditions during which the regulation step controls the PSA. To aid the understanding, it may be said that the new regulation will for example be fully effective between a flow rate of 100% and a flow rate of 60% of the feed gas, thus leading to a continuous improvement in the efficiency. For a flow rate of 60%, the PSA will achieve its maximum possible performance. For a lower feed flow rate, let's say from 60% to 30% of the nominal feed flow rate, this new regulation provides nothing further and it is advisable to then use the conventional regulation.

In practice, only the feed gas flow rate that can actually vary within very large ranges may generally result in this operating case. Pressures, temperature, composition have lesser effects than the new regulation may take into account over the entire range of variation.

the phase time is kept constant from one cycle to the next, during at least one portion of the range of variation of the operating conditions;

the pressure cycle comprises 1 to 6 equalizations, typically from 2 to 5;

the compound X is hydrogen;

the compound X is a compound that is less adsorbable than $CO_2$, preferably CO, the $CO_2$ being produced during the blowdown and/or the elution.

The process according to the invention may indeed be applied to PSAs in which the upgraded product is extracted at low pressure. The regulation principle will then generally result in the low-pressure fraction being produced purer.

The "nominal conditions" may be defined as all of the conditions set by the client that determine the design of the unit and the performance thereof.

For a $H_2$-PSA for example, the composition of the feed gas, the purity required for the $H_2$, the production flow rate, the feed gas pressure, the production pressure (or the maximum pressure drop across a unit) and the minimum pressure for the waste gas will be thought of. Other conditions may be added to these main parameters, which other conditions will lead to optionally having to overdesign certain equipment (maximum fluctuation of the composition of the regeneration gas possibly determining the size of the waste gas capacity for example). It should be noted that a minimum $H_2$ extraction efficiency may be among the design data: it will then set the minimum number of equalizations to be provided in the determination of the cycle of the PSA. Instead of a precise composition of the feed gas, composition ranges for each constituent may be indicated. It is then the responsibility of the person doing the design to determine the most restrictive composition for the PSA.

In practice, the PSA will be operated according to actual conditions which may be quite different from the nominal (design) conditions. Indeed, the composition of the feed gas, its flow rate, its temperature, the pressures which depend on the operating conditions of other units (such as a steam reforming unit), on the maintenance condition of equipment (exchanger, reactor) or on the initial raw material (composition of a coal, nitrogen content of a natural gas, etc.) are unlikely to all be equal to the predictions. It is generally observed that the client has a tendency to combine the most restrictive conditions (maximum flow rate for example corresponding to an exceptional configuration of the upstream units, such as a new catalyst in a reactor, exceptionally favorable atmospheric conditions, etc.) in order to define the specifications of the PSA.

It is therefore common to have more favorable operating conditions.

The invention will now be described in greater detail using the following two cases, the first corresponding to an $H_2$-PSA unit standard as regards the cycle and the basic regulation, the second being regulated according to the invention.

By way of example and nonlimitingly, a 7.1.3 PSA cycle is chosen, i.e. one with 7 adsorbers, only one in production at the same time and 3 pressure equalizations.

The representation used below consists, during the time of one phase, in demonstrating the situation of the 7 adsorbers.

It is then possible, if necessary, to construct the complete cycle by supplementing each line with the following steps.

TABLE 1

| | |
|---|---|
| Ads | Ads |
| Ed1 (dp1 = 1 bar) | Ed2 (dp2 = 1 bar) |
| Ed3 (dp3 = 1 bar) | PP |
| PP | BD |
| P | P |
| Eup3 | Eup2 |
| Eup1 + Rep | Rep |

In practice, when an adsorber has finished its production phase at the High Pressure of the cycle (Ads), it is depressurized by the pressure equalizations Ed1 and Ed2, then via a $3^{rd}$ equalization Ed3, a first purge-providing (PP) step. The next phase consists of a supplementary purge-providing step, so that elution gas is produced over the complete duration of one phase, and of a counter-current blowdown step. The next phase is dedicated to the elution step. The phase that follows corresponds to the equalizations at increasing pressure Eup 3 and 2 and the last phase consists of the last equalization Eup 1 and of the final repressurization by the production (it is also possible to repressurize via the feed gas). It will be noted that it has been chosen to repressurize throughout the duration of the phase, therefore simultaneously with the first equalization, in order to ensure a constant production flow rate. This slowly limits the gas recovered during the first equalization (Ed1) and thereby slightly reduces the $H_2$ extraction efficiency. In this cycle, the 3 equalizations are said to be incomplete since the exchange of gas between the adsorber at high pressure and the adsorber at lower pressure is interrupted before achieving total equalization of the pressures.

The fact of interrupting the pressure equalization before equilibrium may have a certain number of advantages. Here, it corresponds to an optimum compromise taking into account the economic data between investment and performance of the PSA.

Specifically, it is known that for $H_2$-PSAs at least, increasing the number of equalizations, a priori up to 4 or 5 if the high and low pressure conditions allow it as is the case customarily for the units treating a syngas originating for example from an SMR unit in the region of 25 to 30 bar abs and the waste gas of which is used at low pressure (around 1.3 bar abs) in order to supply the burners of the SMR, makes it possible to increase the $H_2$ extraction efficiency. This takes place to the detriment of the productivity (and therefore of the investment).

This is furthermore confirmed by the publication: "Parametric Study of a Pressure Swing Adsorption Process", AIChE 1999, Annual Meeting, Dallas, regarding the production of high purity hydrogen from a feed gas formed from a binary methane-hydrogen mixture. The pressure cycles used are similar to those mentioned above. It is indicated that moving from 1 to 3 equalizations makes it possible to gain 2.5% regarding the efficiency but to the detriment of an increase of 40% in the volume of adsorbent.

One explanation for this effect is that the more equalizations there are, the more the impurities front advances into the adsorber and that it is necessary to increase the volume thereof in order to continue to keep the impurities inside. It is noted that the actual equalization number is not necessarily a whole number (2 or 3 for example), which would correspond to the fact that each equalization is complete, but may correspond for example to 0.75, 1.7 or 2.5.

In the characterization of a PSA, for example a 7.1.3 cycle, it will be remembered that the number 3 means that with the skid of valves and pipework and the connections between adsorbers, 3 equalizations could be carried out. These equalizations may for numerous reasons not be complete and in the process description, reference is made rather to actual equalizations (for example 2.5 equalizations). Reference is made to increasing the number of equalizations, for example moving from 2.5 to 2.8 in order to signify an increase in the exchanges of gas between adsorbers. The 2.5 or 2.8 equalizations may be carried out by a cycle having 3 equalizations or optionally having 4 equalizations—in the characterization sense of the unit—if these are incomplete (large residual DPs).

A modification of the equalizations during operation (more or less gas exchanged between adsorbers) will therefore modify both the productivity and the extraction efficiency.

More specifically, an increase in the gas exchanged during these equalizations will generally (in a very broad operating zone) increase the efficiency and decrease the productivity. In order to treat the same amount of feed gas and to produce at the same purity, it will be advisable to accelerate the cycle in order to compensate for the drop in productivity.

Another parameter that acts on the performance and the investment by the productivity is the amount of elution gas.

The impact of the amount of elution gas, withdrawn during the purge-providing (PP) steps, on the performance of the process is also a known fact. For this purpose, it is conventional to use the P/F elution ratio which is the ratio (in actual cubic meters), i.e. under the pressure and temperature operating conditions, of the amount of elution gas used to the amount of feed gas introduced into the adsorber during the cycle. FIG. 2 from the aforementioned AIChE article shows that the optimum is obtained for a ratio of 1.1 to 1.2.

In any case, the fact that the P/F ratio should be greater than 1 is not limited to $H_2$-PSAs. Thus, in the book "Pressure Swing Adsorption" by Ruthven, Farooq, Knaebel, this point is addressed, for example in the paragraph "Purge flow rate, Air drying, PSA Processes" from Chapter 6, where it is explained that for a PSA air dryer unit, a P/F ratio of 1.15 is recommended. A ratio of 1 makes it possible in theory to move back the impurities front to where it was before adsorption. The effective adsorption capacity is then minimum.

Ratios from 1.2 to 1.4 will lead, on the contrary, to discharging more impurities during the regeneration phase and thus to increasing the productivity to the detriment of the efficiency.

The determination of the elution ratio of an industrial or pilot unit may be carried out from the measurement of the feed and elution flow rates of the gas. It may also be determined from PSA process simulation software like that which was carried out in the article presented to the AIChE.

In recent $H_2$-PSAs, the elution gas originates from one or multiple purge-providing steps located during the blowdown, more particularly co-current blowdown. Although the production of elution gas often takes place after the last equalization and before the counter-current blowdown, as in our example, very many variants exist: step simultaneous with one or more equalizations, step inserted between 2 successive equalizations, simultaneous with the start of the counter-current blowdown, etc.

In certain PSAs, relatively old $H_2$-PSAs for example, or for other types of separation, the elution gas may originate from the production, or even in some particular cases be a gas outside the unit. In our case, such a make-up elution, complementary to that made by the depressurization gases, is always possible and its optional presence does not modify the subject of the invention. The calculations will obviously have to take this additional flow rate into account in order to define the new regulation.

Generally, the elution phase consists in facilitating the desorption of the impurities and cleaning the production side zone by "moving back the impurities front". Increasing the amount of elution gas will make it possible to better eliminate the impurities and therefore to require a smaller volume of adsorbent but this is to the detriment of the production since this consumes the least adsorbable gas.

It will be noted that the quality of the elution gas also has an effect on the desorption of the impurities. A purer elution gas will aid the retreat of the impurity front and will therefore make it possible to better regenerate the adsorbent. Generally, the gas resulting from the co-current depressurization of an adsorber is less and less pure as the pressure drops. By modifying the pressures at the start and/or at the end of the step of producing the elution gas, there will collectively be a variation in the amount of gas and in the composition (quality) of the latter.

It will be noted here that due to the fact of linking the depressurization steps, modifying a pressure generally amounts to modifying at least two gas exchanges. Referring for example to FIG. 5, it is understood that shifting downward the pressure P3 at the end of the $3^{rd}$ equalization (by reducing DP3) amounts to increasing the amount of gas exchanged during this equalization and to reducing the amount of elution gas (by assuming P4 is unchanged).

A regulation based on the determination of P3—or DP3—must therefore take into account these two effects. Current simulation programs are capable of integrating them and thereby it is possible to define the most suitable algorithms.

It will be noted that the progress made in the simulation of such PSA processes, in particular the reduction in the calculation time necessary to arrive at a converged solution, will shortly lead to integrating such software into the instrumentation and control system in order to calculate the optimal operating parameters of the PSA in real time as a function of the operating conditions. In particular, in our case, the set points of the pressures will be directly derived from the calculation. Such a development will only make this new regulation principle more effective and easier to implement.

In the case of the PSA, the cycle of which appears in Table 1 and in FIG. 5, as a function of the operating conditions and of the economic conditions set by the client, an economic optimum has therefore been sought, regarding the nominal case, with the aid of tests or simulations, which economic optimum will correspond for example for this $H_2$-PSA to choosing the total number of adsorbers (7), the number of adsorbers simultaneously in adsorption mode (1), the number of equalizations (3), the P/F ratio, etc.

For other working conditions, for example reduced operating conditions, use was made to date of the regulations described above which consists in modifying the phase time in order to maintain the desired purity.

Generally, the phase time of a PSA of this type is regulated via a relationship of the type:

$$Tph = TphN*(Dn/D)*K1*K2*K3*Ki \ldots *KM$$

where
Tph: actual phase time (for the phase in progress)
TphN: nominal (design) phase time
DN: nominal feed flow rate
D: actual flow rate
K1: $H_2$ purity coefficient
K2: operating conditions coefficient
K3: coefficient linked to the upstream or downstream periodic operations
Ki
KM: operator coefficient In many cases, some of the coefficients K1 . . . Ki are not used and the regulation is limited to the correction as a function of the flow rates.

The first part of the formula Tph=TphN*(Dn/D) consists in adapting the phase time to the flow rate to be treated. As already mentioned, this enables the adsorbent to treat the same amount of feed gas during each phase. Use is generally made of $Nm^3$ in order to take into account the flow rates via flowmeters corrected in terms of pressure, temperature and if necessary density, the latter optionally determined by analysis.

The coefficient K1 is the correction coefficient linked to the purity. It must lead to shortening the phase time in the case of a risk of loss of purity and to lengthening it in the case of too high a quality. As for all the parameters, there are several ways of integrating the purity of the hydrogen into the phase time calculation. The example below describes one thereof, nonlimitingly, for an acceptable impurity threshold of 10 ppm.

TABLE 3

| Purity threshold | <5 ppm | between 5 ppm and 8 ppm | between 8 ppm and 10 ppm | between 10 ppm and 11 ppm | <11 ppm |
|---|---|---|---|---|---|
| K1 | 1.02 | 1.01 | 1.0 | 0.98 | 0.95 |

In practice, there is no correction between 8 and 10 ppm of measured impurity (K1=1.0). There is more correction in the case of pollution (0.98/0.95) than in the case of too high a purity (1.01/1.02).

Optionally added to that are temporizations before said correction is effective, corresponding for example to a complete cycle time. Here too, there will be a tendency to temporize in the case of too high a purity and to correct as quickly as possible in the case of a risk of pollution.

The correction may relate to the phase time to come or optionally to that in progress if the process allows it.

This regulation may be rendered inoperative by the decision of an operator, like for that matter the majority of the corrections.

The coefficient K2 is linked to an operating parameter of the PSA measured continuously or semi-continuously, capable of varying over time. This may be, still by way of nonlimiting example, the content of nitrogen in the feed gas or the low regeneration pressure. Via simulation, or tests, the influence of this parameter on the performance of the PSA, in particular on the productivity and thereby on the phase time, is known.

Such a correction makes it possible to immediately adapt the phase time to the new operating conditions without waiting for the purity of the hydrogen not to vary, which may take a certain number of cycles. Even if the correction is not perfect, this limits the variations of the $H_2$ purity.

The coefficient K3, if it exists, takes into account the operation of upstream or downstream units that have an impact on the operation of the PSA. An example corresponds to the case where the feed flow rate of the PSA is used periodically to regenerate another unit for treating gas by adsorption. At a given moment and for a known period, the feed gas will see its composition change, for example in the case of an $H_2$-PSA, the feed flow rate of which is used to regenerate a syngas dryer, to have a higher content of CO. Here too, the idea is to take the initiative and to immediately correct the phase time over a given time.

Lastly, KM is the operator correction. It is generally used after having put out of service the regulation regarding the purity. In order to have a large margin regarding the purity of the production over a period where there is a risk for example of perturbations, the operator decides to shorten the phase time in order to ensure the purity even to the detriment of the extraction efficiency.

As is seen, this type of regulation, already produced, makes it possible to maintain both the required purity and the efficiency. For the PSA it leads to a longer phase time than the nominal phase time being adopted since the operating conditions are more favorable.

It will also be noted:
that it may be possible, if the design allows it, to shorten the phase time in order to be able to treat a greater flow rate even if it means losing a little efficiency in such an operation. This approach may be quite rapidly limited by mechanical constraints such as the rate of attrition through the adsorbent beds, valves—whether this is a limitation of the flow rate passing through or of the handling time—size of the waste gas capacity, etc.
that all the parameters and coefficients are provided in order to remain within defined ranges with various alarms and optionally safety measures.

Figure 6:
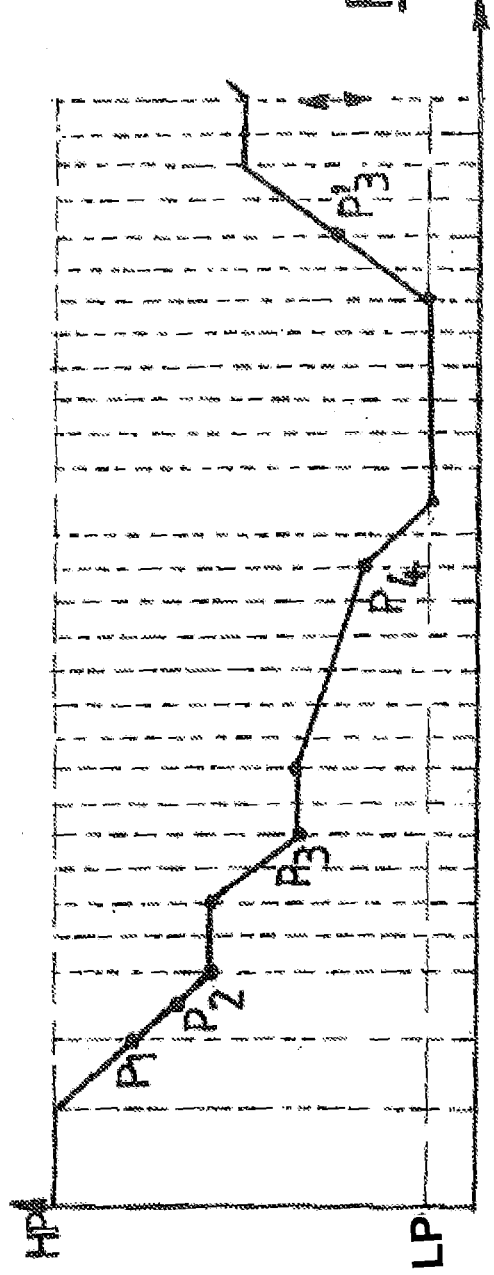
FIG. 6 illustrates the cycle indicating a stretching along the time axis of the initial cycle, in accordance with one embodiment of the present invention.

The application of this regulation then makes it possible to obtain the cycle from FIG. 6 which is in fact a stretching along the time axis of the initial cycle. The pressure differences at the end of equalization are unchanged. Since the repressurization step is longer, custom requires that the repressurization flow rate be reduced in order to have the minimum of fluctuations. In practice, this results, via the progression of the first equalization, in a small variation of the pressures. Similarly, since the flow rates are lower, the pressure drops decrease and this slightly modifies the pressures. In practice, the pressures remain virtually identical except for these observations and there is no regulation that tends to modify them.

The regulation according to the invention for its part will make it possible to benefit from the difference between the recalculated phase time and the nominal phase time in order to increase the performance of the PSA, in particular the extraction efficiency.

As for the basic regulation, there are many ways of implementing this new regulation. The simplest way of illustrating it is to start again from the conventional regulation described above.

Let it be assumed that the result of the calculation leads to Tph=1.18 TphN.

In such a case, it will be possible to increase the equalizations, and/or reduce the amount and/or quality of elution gas, which will lead to the impurity front moving forward in the adsorber and/or to the adsorbent being regenerated less well and thereby to the productivity being reduced.

Under the same feed conditions, it will therefore be necessary to accelerate the phase time in order to compensate for this provoked reduction in the productivity, but in return, an increase in the efficiency, etc. will be obtained.

Via simulations, or tests, it is advisable to establish the relationship between productivity, number of equalizations and elution quantity/quality. By integrating this modification into the regulation loop, it will be possible to retain a phase time equal or similar to TphN even in a case of more favorable operation and to produce more (increase in the efficiency at constant feed).

This regulation will be operational over a broad range of operating conditions, in particular for more favorable operating conditions, but beyond a threshold it will be advisable to return to a standard regulation, that is to say to increase the phase time.

This threshold may correspond for example to the moment where all the equalizations will be complete and/or the elution flow rate will be minimum.

Compared to this type of regulation where each factor acts as it were separately and in which the final set point is the result of a multiplication of calculations and/or corrections, regulations exist where all of the data are treated simultaneously via one or more algorithms giving in response the characteristics of the regulation (phase time, opening of the valves, etc.). The future possibility of integrating PSA simulation software into the regulation system was also mentioned above. The use of such systems does not call into question the advantage of the proposed regulation but on the contrary may simplify the implementation thereof.

It will be noted that the gas exchanges between adsorbers during equalizations and also the amount of gas withdrawn for the elution are in all cases controlled by on-off valves with adjustment of the flow rate passing through during the start-up of the unit or by control valves, the opening of which is controlled by the instrumentation and control system.

Pressures at the end of the step are often the set point of the controlled valves.

Within the context of the invention, the valves that correspond to the pressures that it is desired to modify will obviously be control valves. As has just been stated, the set points will preferably be pressures at the end of steps rather than flow rates for issues of simplicity of implementation of the regulations. Nevertheless, in principle, there is equivalence in regulating with respect to pressure or with respect to flow rate: the result is the amount of gas exchanged or withdrawn. Irrespective of the regulation chosen (with respect to pressure or with respect to flow rate), this results in a modification of the internal pressures of the PSA, a criterion chosen for characterizing the invention.

The graph from FIG. 4 The design point of the PSA is point A of the graph. For the nominal flow rate of feed gas (100 on the abscissa), the PSA unit has been optimized with a minimum phase time $T\phi$—in order to have the minimum volume of adsorbent—and for the required extraction efficiency $\eta A$.

It is not necessary here to go back into detail of the determination of the optimal phase time which may be based on the minimal duration required for a step (owing to the adsorption kinetics, pressure drops, etc.) or on a series of steps that have to keep within a phase time.

The conventional regulation will make it possible to maintain the nominal efficiency $\eta A$ by increasing the phase time in inverse proportion to the reduction of the feed flow rate. Thus at 80% of the nominal flow rate, the phase time will correspond to 1.25 $T\phi$, at 50% to 2 $T\phi$, at 33% to 3 $T\phi$.

The new regulation according to the invention corresponds to the thick line from the same FIG. 4.

The overdesign of the PSA is taken advantage of relative to the design point brought about by the reduction in flow rate in order to use a cycle of lower productivity and of higher efficiency. In order to do this, the equalizations are increased and the amount of elution gas is reduced. The curve AB of the graph is moved over at constant phase time $T\phi$ with an efficiency that increases until reaching $\eta B$ for a flow rate of 70% of the nominal flow rate.

Figure 7:
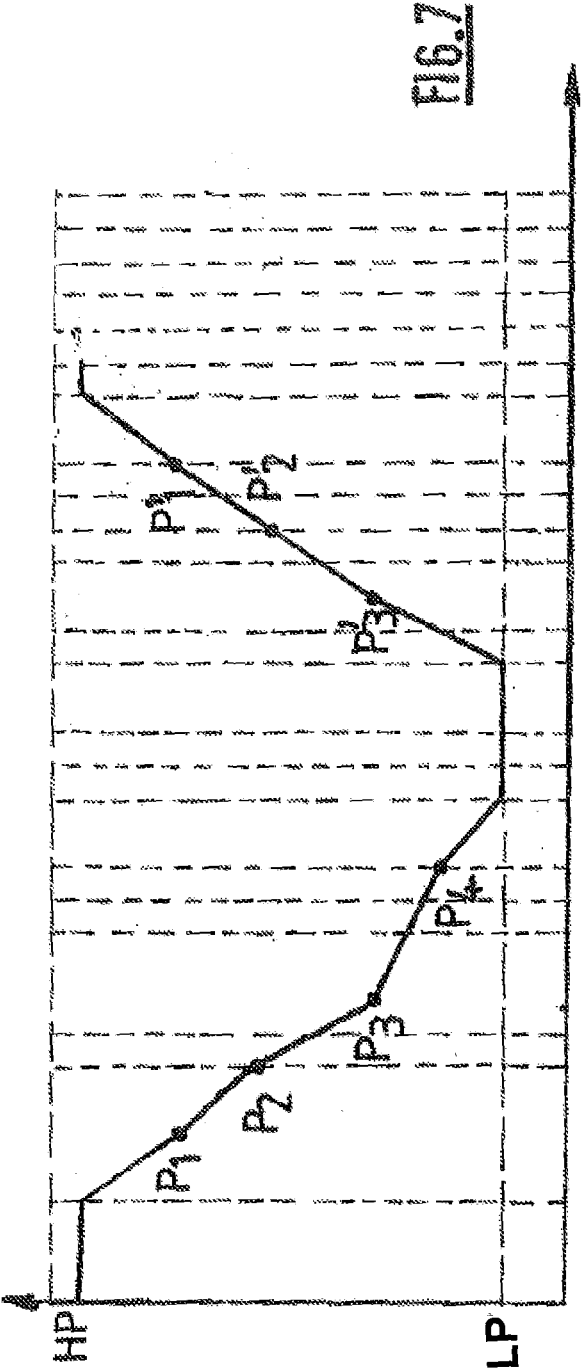
FIG. 7 illustrates the end of production of elution gas optionally modified by the regulation in accordance with one embodiment of the present invention.

In this case, the cycle from FIG. 7 with 3 complete equalizations is obtained. Here the pressure P4 at the end of production of elution gas is maintained unchanged but in practice this could optionally be modified by the regulation if this makes it possible to improve the performance.

In the example given, below 70% of the flow rate, a conventional regulation is returned to, that is to say that the phase time will be increased, but this will make it possible to maintain the maximum efficiency $\eta B$ and not the lower design efficiency $\eta A$.

According to the design conditions, the point B may correspond to the case where the amount of elution gas becomes too low to be able to ensure the purity desired for the production (below, the performance drops and offers no advantage), or to the moment where all the equalizations are complete.

It is advisable here to make a certain number of observations.

Moving over the curve AB is normally the optimum since advantage is completely taken of the overdesign which is converted into efficiency. It is of course possible to use an approach intermediate between the two regulations described by using only a fraction of the overdesign for the purpose of increasing the efficiency and of at the same time adjusting the purity of the production to the targeted purity via an increase in the phase time.

The potential gain in efficiency will depend on the point chosen for the design.

For an $H_2$-PSA, it may be several percent in the case of a moderate nominal efficiency—for example going from 86% to 88%—or several tenths of a percent in the case of an initial efficiency that is already very high, for example from 89.1% to 89.5%. It may however be observed that in the second case, it is generally a unit that produces large flow rates of hydrogen, more than 100 000 $Nm^3/h$, and that the supplementary production is counted in hundreds of $Nm^3/h$.

Conversely, when starting from a relatively low efficiency, it is possible to achieve very significant gains in efficiency (point C from FIG. 4).

Point D is placed as a matter of interest. It is generally possible to treat more feed gas than the nominal flow rate at the expense of a loss of efficiency. The regulation according to the invention, by adjusting the amount of elution gas, may also make it possible to find a better solution than the simple reduction of the phase time.

The feed gas flow rate, more particularly a reduction in the flow rate treated, has been selected as an operating parameter that makes it possible to provide a margin regarding the volume of adsorbent as the most direct example. It is understood that other parameters may have the same effect such as a low pressure below the nominal low pressure, which facilitates the regeneration. Likewise, it is possible to have a purer feed gas, more favorable temperature or pressure conditions of the feed gas, etc. In these cases, the correction linked to the purity of the hydrogen will be at first generally a determining factor in the regulation since the variation of these operating parameters (pressures, composition, etc.) will not be able to be directly taken into account in the regulation but only by the effects caused. In practice, a drop in the regeneration pressure for example, at an unchanged feed flow rate, will result, in order to maintain the required purity, in treating slightly more gas, i.e. in increasing the phase time at constant feed flow rate. This increase in phase time will then make it possible to reduce the elution by the production in order to return to the nominal phase time and by so doing increase the extraction efficiency.

As has already been stated, in the case of a more sophisticated instrumentation and control system, the characteristics of the regulation (the set point of the pressures for example) will be able to be set a priori without the need for a real phase time/nominal phase time difference.

The initial cycle chosen as an example comprised a pressure difference at the end of each of the 3 equalizations. It would be equally possible to start from a cycle comprising a single incomplete equalization and adapt it in order to tend toward only complete equalizations.

In the case of several initially incomplete equalizations, it will be advisable to choose, as a function of the process, the best regulation (simultaneous modification of the three DPs or successive modifications, etc.).

In order to better explain the principle of the invention, the case of $H_2$-PSAs has been taken, which PSA process has probably known the most developments in recent years due to its success with various hydrogen-consuming industries.

This is understood to mean hydrogen having a purity of greater than 95 mol %, generally greater than 98 mol % and that may reach, when the consuming process requires it, purities of greater than 99.99%.

But the invention in its very principle may apply, a priori, to all PSA cycles in the most general sense since there is a relationship between the number of equalizations and/or amount of elution gas and the productivity/efficiency pair, etc.

Thus, it is possible to envisage, for example, a PSA unit intended to strip the $CO_2$ from an oxygen blast furnace gas in order to recycle it while producing $CO_2$, at a purity sufficient to sequester it either directly, or after a supplementary treatment (coldbox, membrane, other adsorption unit, etc.).

The cycle of the $CO_2$-PSA may comprise supplementary steps such as a Rinse step which consists in circulating in co-current mode, in the adsorbent bed, a fraction of the $CO_2$ production at the pressure at the end of the last equalization in order to drive the lightest constituents (CO, $CH_4$, $H_2$, $N_2$) from the adsorbent inlet zone in order to subsequently recover, during the Blowdown (counter-current depressurization), an effluent highly enriched in $CO_2$. It will be noted that the $CO_2$ may also be extracted from the adsorber during the elution phase, or at least during part of this next step with the (optional) aid of a vacuum pump. It is thus possible to recover a gas containing more than 80 mol % of $CO_2$.

The gas recovered at the outlet during the Rinse step is used during a purge step P to push the $CO_2$ back toward the inlet end of the adsorber. The gas recovered at the purge outlet is discharged to outside of the unit or recycled in the feed gas.

More simply, it may be a question of stripping the $CO_2$ from a conventional (air combustion) blast furnace gas in order to reinject the $CO_2$-depleted gas into the blast furnace.

It should be noted that in the latter cases, the component X produced at the high pressure will be one of the constituents that is less adsorbable than $CO_2$, for example CO.

Any increase in the yield of CO, results in more CO in the high-pressure gas and therefore less CO in the low-pressure gas, i.e. in the $CO_2$ which thus sees its content increased.

The invention, in its principle of taking advantage of operating conditions that are more favorable than the nominal conditions in order to increase the yield of X produced at high pressure, may therefore be equally advantageous when the upgraded product is the product extracted at low pressure.

In this case, the gain will generally be an increase in the purity of said low-pressure production.

Among other applications of PSAs capable of using the regulation according to the invention, mention may be made, non-limitingly, of the production or purification of helium, the production of oxygen, the production or stripping of nitrogen, the separation of hydrocarbons, gas drying, etc.

The basic applications envisaged for PSAs according to the invention are preferably processing units of high flow rate, for example more than 100 000 $Nm^3/h$, with conventional adsorbents and standard valves. The phases—within the meaning of the definition given above—will have a duration preferably equal to 10 seconds and more, resulting in cycles having a duration of generally more than one minute and preferably of at least 2 minutes.

Nevertheless, the cycles according to the invention are also very suitable for the new adsorbent structures in the process of being developed.

The expression "new structures" is understood to mean structured adsorbents. The adsorbent is no longer in the form of millimetric particles (beads, rods, crushed materials, pellets, etc.) but has more complex geometries and sizes of several centimeters or even several tens of centimeters. They may be monoliths, parallel-passage contactors, a set of parallel fibers, adsorbent fabric, etc. The cycle times are then generally much shorter, of the order of several seconds or tens of seconds.

It may then be particularly advantageous to retain constant step, phase and cycle durations (since they are very short and difficult to adjust) and modify a physical parameter such as a pressure.

The invention claimed is:

1. A pressure swing adsorption (PSA) process for producing a gas stream enriched in a compound X from a feed gas stream, the process comprising at least 2 adsorbers, each adsorber being subjected to a pressure cycle having a high pressure and a low pressure and comprising the following successive steps:
   a) adsorption at the high pressure with production of the gas stream enriched in compound X,
   b) depressurization to the low pressure with production of at least one portion of an elution gas,
   c) elution at the low pressure by means of the elution gas,
   d) repressurization to the high pressure, wherein the pressure cycle has a phase time corresponding to the duration of a pressure cycle divided by the number of adsorbers and the pressure of the pressure cycle, located between the high pressure and the low pressure, is modified so as to keep, during at least one portion of the range of variation of the operating conditions, the phase time of the PSA equal to or within ±5% of the nominal phase time, corresponding to the phase time of the PSA under the design conditions.

2. The process of claim 1, wherein:
the pressure cycle comprises at least 1 equalization,
the depressurization step b) comprises at least a first sub-step of co-current depressurization and at least a second sub-step of counter-current depressurization, and the modified pressure of the pressure cycle, located between the high pressure and the low pressure, is selected between the pressures at the start or end of equalization, the pressures at the start or end of production of the elution gas, and the pressure at the start of counter-current depressurization, and
the compound X is a compound that is less adsorbable than $CO_2$, with the $CO_2$ being produced during the blowdown and/or the elution.

3. The process of claim 2, wherein the pressure selected from the pressure cycle, located between the high pressure and the low pressure, is modified via at least one of the residual pressure differences at the end of equalization.

4. The process of claim 2, wherein at least one of the pressures at the start or end of one at least of the steps for production of the elution gas is modified, thus changing the quantity and/or the quality of the elution gas.

5. The process of claim 1, wherein the elution gas comprises:
a fraction of a gas stream resulting from the depressurization of an adsorber, and
a fraction of the gas stream enriched in compound X or a fraction rich in compound X originating from another unit.

6. The process of claim 1, wherein the phase time is kept constant from one cycle to the next, during at least one portion of the range of variation of the operating conditions.

7. The process of claim 1, wherein the pressure cycle comprises 1 to 6 equalizations.

8. The process of claim 1, wherein the compound X is hydrogen.

9. The process of claim 1, wherein the compound X is a compound that is less adsorbable than $CO_2$, the $CO_2$ being produced during the blowdown and/or the elution.

* * * * *